United States Patent
Ashok et al.

(10) Patent No.: US 12,468,723 B2
(45) Date of Patent: Nov. 11, 2025

(54) TIME TRANSFORMATION ENGINE FOR A MAINFRAME SYSTEM

(71) Applicant: Bank of America Corporation, Charlotte, NC (US)

(72) Inventors: Kajuluri Venkata Ashok, Channai (IN); Vikas Kumar Sahu, Telangana (IN); Avinash Nigudkar, Mumbai (IN); Karthikeyan Krishnan, TamilNadu (IN); Yadava Krishnan Srinivasan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 5 days.

(21) Appl. No.: 18/239,574

(22) Filed: Aug. 29, 2023

(65) Prior Publication Data

US 2025/0077541 A1    Mar. 6, 2025

(51) Int. Cl.
  *G06F 16/29*    (2019.01)
  *G06F 16/25*    (2019.01)

(52) U.S. Cl.
  CPC ............ *G06F 16/258* (2019.01); *G06F 16/29* (2019.01)

(58) Field of Classification Search
  CPC ............................... G06F 16/258; G06F 16/29
  USPC ........................................................ 707/756
  See application file for complete search history.

(56) References Cited

U.S. PATENT DOCUMENTS

| | | | | |
|---|---|---|---|---|
| 5,579,513 A | * | 11/1996 | Strohmer | G04G 7/00 713/600 |
| 5,926,816 A | * | 7/1999 | Bauer | G06F 16/273 709/248 |
| 6,317,746 B1 | * | 11/2001 | Franklin, Jr. | G06Q 10/109 717/124 |
| 7,284,155 B2 | | 10/2007 | Faihe et al. | |
| 7,689,875 B2 | | 3/2010 | Cahill et al. | |
| 8,738,767 B2 | | 5/2014 | Fake et al. | |
| 9,678,531 B2 | | 6/2017 | Bar et al. | |
| 10,333,797 B2 | | 6/2019 | Wang et al. | |
| 10,528,585 B2 | | 1/2020 | Bender | |
| 10,630,811 B1 | | 4/2020 | Vadaparty et al. | |
| 2003/0046670 A1 | * | 3/2003 | Marlow | H04L 69/329 717/140 |

(Continued)

FOREIGN PATENT DOCUMENTS

| | | | | |
|---|---|---|---|---|
| CN | 111078268 A | * | 4/2020 | ............... G06F 8/70 |
| CN | 116719874 A | * | 9/2022 | ............. G06F 16/25 |

*Primary Examiner* — Amy Ng
*Assistant Examiner* — Antonio J Caiado
(74) *Attorney, Agent, or Firm* — Banner & Witcoff, Ltd.

(57) ABSTRACT

Various aspects of the disclosure relate to automated conversion of time and/or date information from a first format to a second format and initiating computing functionality based on a successful conversion event. Mainframe computer hardware and software are provided for automatically converting differing time formats used across an enterprise computing network, automatically presenting times in multiple formats and/or translations of times across time zones for different regional computing systems of the enterprise computing network, and translating time formats based on an input and automatically pulling data records based on time zones of one or more of the involved computing systems and/or a location associated with the input source.

18 Claims, 10 Drawing Sheets

(56) References Cited

U.S. PATENT DOCUMENTS

| | | | |
|---|---|---|---|
| 2003/0065963 A1* | 4/2003 | Gregg | G06F 1/04 |
| | | | 713/500 |
| 2004/0120698 A1* | 6/2004 | Hunter | H04N 5/9201 |
| | | | 386/331 |
| 2004/0193578 A1* | 9/2004 | Yaeger | G06F 40/103 |
| 2005/0038830 A1 | 2/2005 | Lee | |
| 2008/0178150 A1* | 7/2008 | King | G06F 8/20 |
| | | | 717/114 |
| 2012/0296960 A1* | 11/2012 | Kreuzer | H04L 67/1097 |
| | | | 709/203 |
| 2014/0149560 A1* | 5/2014 | Hakami | H04L 67/565 |
| | | | 709/221 |
| 2017/0053004 A1* | 2/2017 | Bender | H04L 67/06 |
| 2018/0275153 A1* | 9/2018 | Gwon | G01N 35/00663 |
| 2018/0373210 A1* | 12/2018 | Soroka | G05B 23/0208 |
| 2019/0095437 A1 | 3/2019 | Park et al. | |
| 2019/0251488 A1 | 8/2019 | Delfranco et al. | |
| 2021/0390959 A1* | 12/2021 | Jain | A61B 5/7267 |

\* cited by examiner

Converts the PAST/PRESENT/FUTURE input time from EST to IST vice versa, provided valid EST or IST input.

| REG | DD | - | MM | - | YYYY | HH | : | MM | AM\|PM | |
|---|---|---|---|---|---|---|---|---|---|---|
| EST | 10 | - | 12 | - | 2019 | 03 | : | 07 | AM | |

→ 430

EST input:

| REG | DD | - | MM | - | YYYY | HH | : | MM | AM\|PM | 10.5 HOURS LEADING |
|---|---|---|---|---|---|---|---|---|---|---|
| EST | 10 | - | 12 | - | 2019 | 03 | : | 07 | AM | = IST 10/12/2019 01:37 PM |

IST input:

| REG | DD | - | MM | - | YYYY | HH | : | MM | AM\|PM | 10.5 HOURS LAGGING |
|---|---|---|---|---|---|---|---|---|---|---|
| IST | 10 | - | 12 | - | 2019 | 01 | : | 37 | PM | = EST 10/12/2019 03:07 AM |

| REG | DD | - | MM | - | YYYY | HH | : | MM | AM\|PM | 10.5 HOURS LEADING |
|---|---|---|---|---|---|---|---|---|---|---|
| EST | 10 | - | 12 | - | 2019 | 03 | : | 07 | AM | = IST 10/12/2019 01:37 PM |

| REG | DD | - | MM | - | YYYY | HH | : | MM | AM\|PM | 10.5 HOURS LAGGING |
|---|---|---|---|---|---|---|---|---|---|---|
| IST | 10 | - | 12 | - | 2019 | 01 | : | 37 | PM | = EST 10/12/2019 03:07 AM |

FIG. 7A

| REG | DD | - | MM | - | YYYY | HH | : | MM | AM\|PM | |
|---|---|---|---|---|---|---|---|---|---|---|
| XST | 10 | - | 12 | - | 2019 | 03 | : | 44 | AM | = INVALID REGION |
| EST | 29 | - | 02 | - | 2019 | 03 | : | 44 | AM | = INVALID DAY |
| EST | 31 | - | 11 | - | 2019 | 03 | : | 44 | AM | = INVALID DAY |
| EST | 01 | - | 13 | - | 2019 | 03 | : | 44 | AM | = INVALID DATE DD-MM-YYYY |
| EST | 10 | - | 12 | - | 1111 | 13 | : | 44 | AM | = INVALID HOUR |
| EST | 10 | - | 12 | - | 1111 | 11 | : | 60 | AM | = INVALID MINUTE |
| EST | 10 | - | 12 | - | 1111 | 11 | : | 59 | XM | = INVALID AM\|PM |

FIG. 7B

Converts any valid Julian day(YYDDD) to Gregorian day(DD MMM YYYY), provided Julian day input.

Converts any valid Gregorian day(DD MMM YYYY) to Julian day(YYDDD), provided Gregorian day input.

Ex: Mainframe system logs registered on the basis of Julian Date's

```
M 8000000 XXXX      XXXXX 22:22:08.65 xxxxxxxx 00000094  DSNT375I  $SSID PLAN=XXXXXXXX WITH 957
D                                      957 00000094           CORRELATION-ID=XXX
D                                      957 00000094           CONNECTION-ID=SERVER
D                                      957 00000094           LUW-ID=XXXX.XXX
D                                      957 00000094
D                                      957 00000094  THREAD-INFO=XXXXX:
D                                      957 00000094  XXXXXX
D                                      957 00000094           IS DEADLOCKED WITH PLAN=XXXXXX WITH
D                                      957 00000094           CORRELATION-ID=XXXX
D                                      957 00000094           CONNECTION-ID=XXXX
D                                      957 00000094           LUW-ID=XXXX
D                                      957 00000094
D                                      957 00000094  THREAD-INFO=XXXX
D                                      957 00000094  XXX
E                                      957 00000094           ON MEMBER XXXX
M 8000000 XXXX      XXXXX 22:22:08.65 xxxxxxxx 00000090  DSNT501I  $SSID DSNILMCL RESOURCE UNAVAILABLE 958
D                                      958 00000090           CORRELATION-ID=XXXX
D                                      958 00000090           CONNECTION-ID=SERVER
D                                      958 00000090           LUW-ID=XXXX
D                                      958 00000090           REASON XXXX
D                                      958 00000090           TYPE XXXXX
E                                      958 00000090           NAME XXXXX.XXXXX.X'13'
```

FIG. 9

TIME TRANSFORMATION ENGINE FOR A MAINFRAME SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to manage its computer systems efficiently, effectively, securely, and uniformly, and particularly manage how internal computer systems exchange information over different geographic regions and/or time zones while providing and/or supporting different products and services offered by the organization.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes automatic conversion of time formats used in a computing system.

Aspects of the disclosure relate to computer hardware and software. In particular, one or more aspects of the disclosure generally relate to computer hardware and software for automatically converting differing time formats used across an enterprise computing network, automatically presenting times in multiple formats and/or translations of times across time zones for different regional computing systems of the enterprise computing network, and translating time formats based on an input and automatically pulling data records based on time zones of one or more of the involved computing systems and/or a location associated with the input source.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Often, enterprise computing network include hardware and software configured to operate as sub-networks having different operating systems. In some cases, functionality may be most efficiently performed within a mainframe system. System logs in mainframe systems, particularly using the z/OS main frame operating systems are registered on Julian dates, while other interconnected network may operate with operating systems incorporating Gregorian dating systems. Because information, such as system troubleshooting information, may be communicated between different operating system-based networks, conversion between the different time formats (and time zones for regionalized networks) may be prone to errors because Julian dates may be hard for a human mind to interpret. Planned mainframe tasks like disaster recovery (DR) tests, production implements, and the like, may be scheduled in mainframe system time which may need to be manually interpreted or individually coded to perform during a relevant local time, such as Indian Standard Time (IST), Greenwich Mean Time (GMT), Eastern Standard Time (EST), and the like. Additionally, date and/or time conversions may be required when a time zone associated with a troubleshooting event (e.g., an incident ticket) generating computing tool and a mainframe system are different when performing an automated troubleshooting investigation. Because human-based and individually coded time conversion routines are often error prone, a need has been recognized for a simplified time conversion tool available within a mainframe environment that is also capable of being integrated within a troubleshooting procedure to provide automatic conversion of dates between Julian and Gregorian presentations and translation between different regional time zones, and capable of being integrated within an automated troubleshooting environment to pull relevant data records associated with a troubleshooting initiating event in one or more different operating system based sub-networks.

In some cases, a timer engine may be implemented as a mainframe application that provides a user interface within the mainframe operating system, such as a z/OS Interactive System Productivity Facility (ISPF) panel display developed using a mainframe programming language (e.g., REXX) to provide mainframe users a visual representation of times across different time zones and provides the capability for displaying and converting mainframe system date & time related statistics into user friendly format. An additional functionality built into the timer engine may assist in triage of production issues when the customer reports an incident that occurred within a time zone different from the mainframe system time. The timer engine automatically converts the incident-associated time to the mainframe system time and will pull trace data, database log data (e.g., db2 log data) of an impacted application to automatically facilitate triage and increase response times to system problems.

The timer engine may display current system time referenced to one or more different time zones (e.g., EST, IST, and/or the like), may convert past/present/or future times between different time zones, and convert dates from Julian dates to Gregorian dates. Additionally, this same functionality of the timer engine is used when pulling trace data and/or database log data for troubleshooting situations by automatically determining date/time conversions.

Figure 1A:
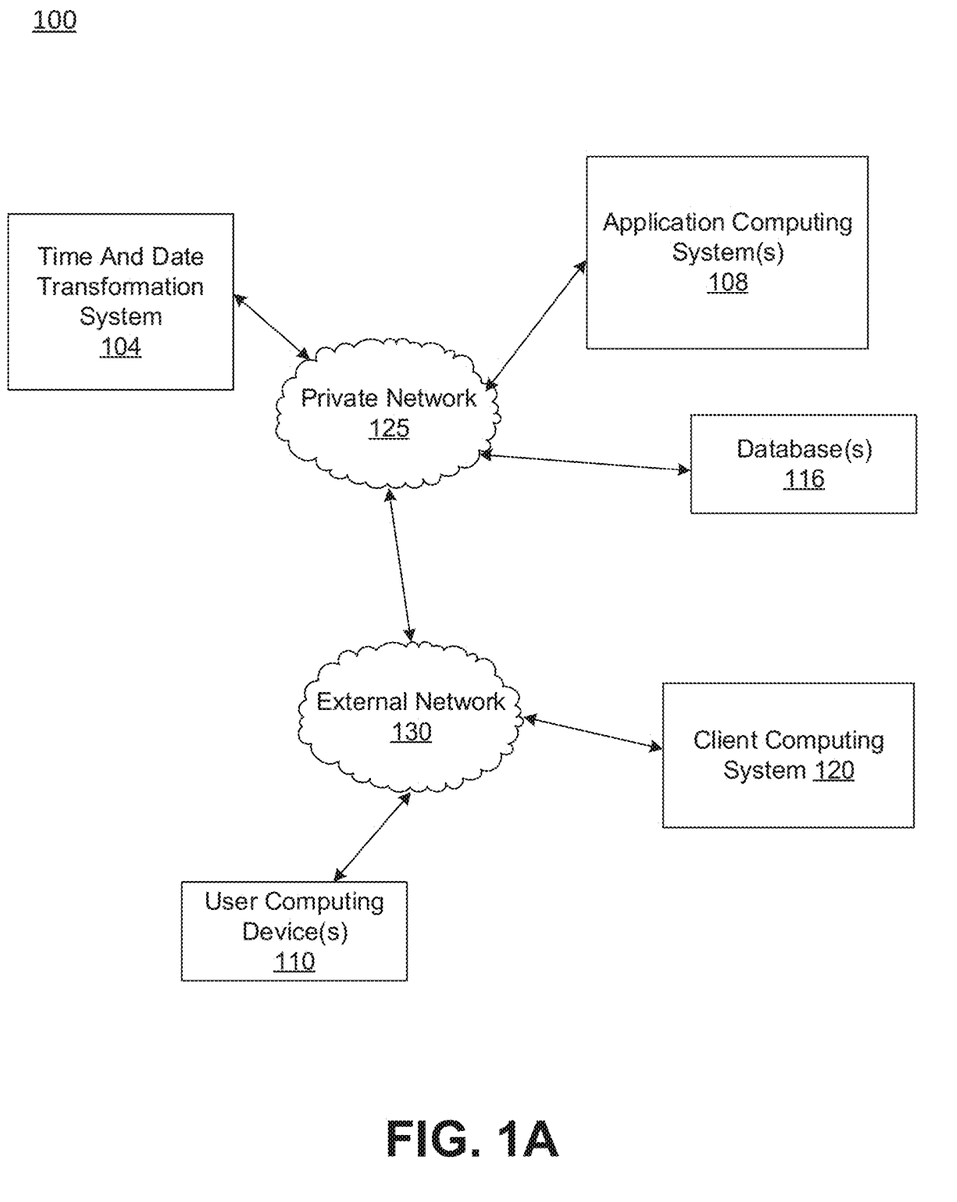
FIG. 1A shows an illustrative computing environment for automatic time conversion and/or translation and use of the converted times within an enterprise network, in accordance with one or more aspects described herein.

FIG. 1A shows an illustrative computing environment 100 for automatic conversion and/or transformation of time and date information within a mainframe computing environment, in accordance with one or more arrangements. The computing environment 100 may comprise one or more devices (e.g., computer systems, communication devices, and the like). The computing environment 100 may comprise, for example, a time and date transformation system 104, one or more application computing systems 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a 3rd Generation Partnership Project (3GPP) cellular protocol, a hypertext transfer protocol (HTTP), etc.).

The time and date transformation system 104 may comprise one or more computing devices and/or other computer components (e.g., processors, memories, communication interfaces) configured to perform one or more functions as described herein. Further details associated with the architecture of the time and date transformation system 104 are described with reference to FIG. 1B.

The application computing systems 108 may comprise one or more computing devices and/or other computer components (e.g., processors, memories, communication interfaces). In addition, the application computing systems 108 may be configured to host, execute, and/or otherwise provide one or more enterprise applications. In some cases, the application computing systems 108 may host one or more services configured facilitate operations requested through one or more API calls, such as data retrieval and/or initiating processing of specified functionality. In some cases, client computing systems may be configured to communicate with one or more of the application computing systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. Application computing systems 108 may comprise various servers and/or databases that store and/or otherwise maintain account information, such as financial account information including account balances, transaction history, account owner information, and/or other information. In addition, the application computing systems 108 may process and/or otherwise execute transactions on specific accounts based on commands and/or other information received from other computer systems comprising the computing environment 100. In some cases, one or more of the application computing systems 108 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system 120 may comprise one or more computing devices and/or other computer components (e.g., processors, memories, communication interfaces). The client computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system 120 is for processing an electronic exchange of goods and/or services. The client computing system 120 may be associated with a specific goods purchasing activity, such as purchasing a vehicle, transferring title of real estate may perform communicate with one or more other platforms within the client computing system 120. In some cases, the client computing system 120 may integrate API calls to request data, initiate functionality, or otherwise communicate with the one or more application computing systems 108, such as via the services. For example, the services may be configured to facilitate data communications (e.g., data gathering functions, data writing functions, and the like) between the client computing system 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by time and date transformation system 104. For example, the database(s) 116 may store time and/or date conversion algorithms, geographic location information associated with different computing systems, local information regarding changing between standard time and daylight savings time, data logs, operational incident reporting information, and the like. In an arrangement, the database(s) 116 may be used for other purposes as described herein. In some cases, the client computing system 120 may write data or read data to the database(s) 116 via the services.

In one or more arrangements, the time and date transformation system 104, the application computing systems 108, the client computing system 120, the user devices 110, and/or the other devices/systems in the computing environment 100 may be any type of computing device capable of receiving input via a user interface, and communicating the received input to one or more other computing devices in the computing environment 100. For example, the time and date transformation system 104, the application computing systems 108, the client computing system 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the time and date transformation system 104, the application computing systems 108, the client computing system 120, the user devices 110, and/or the other devices/systems in the computing environment 100 may, in some instances, be and/or comprise special-purpose computing devices configured to perform specific functions.

Figure 1B:
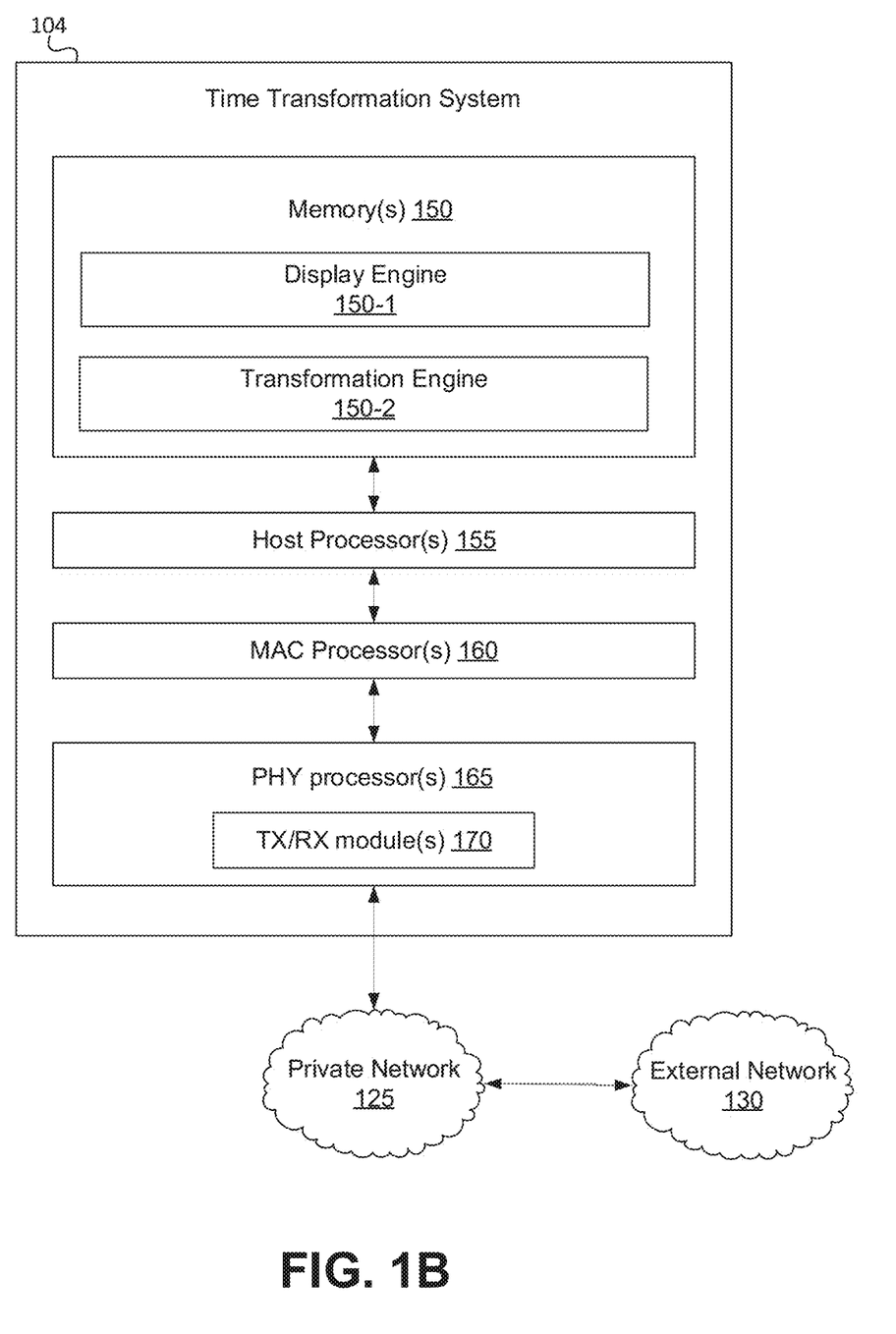
FIG. 1B shows an illustrative computing platform enabled for automatic time conversion and/or translation and use of the converted times within an enterprise network, in accordance with one or more aspects described herein.

FIG. 1B shows an illustrative time and date transformation system 104 in accordance with one or more examples described herein. The time and date transformation system 104 may be a stand-alone device and/or may at least be partial integrated with the development computing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The time and date transformation system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the time and date transformation system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the time and date transformation system 104 may be configured to execute machine readable instructions stored in memory 150. The memory 150 may comprise (i) one or more program modules/engines having instructions that when executed by the one or more processors cause the time and date transformation system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the time and date transformation system 104 and/or by different computing devices that may form and/or otherwise make up the time and date transformation system 104. For example, the memory 150 may have, store, and/or comprise a display engine 150-1, a transformation engine 150-2, and/or the like. The display engine 150-1 may have instructions that direct and/or cause the time and date transformation system 104 to perform one or more operations associated with display of system times and/or dates in different formats, interfaces to allow conversion of specific times and/or dates, and the like. The transformation engine 150-2 may have instructions that may cause the time and date transformation system 104 to automatically convert the Julian dating information of mainframe system into Gregorian dating system information, transforming times between different time zones, and to automatically pull troubleshooting information from databases and/or data logs based on the translated or converted time and date information and in response to a troubleshooting request.

While FIG. 1A illustrates the time and date transformation system 104 and the application computing systems 108, as being separate elements connected in the private network 125, in one or more other arrangements, functions of one or more of the above may be integrated in a single device/network of devices. For example, elements in time and date transformation system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the application computing systems 108.

Figure 2:
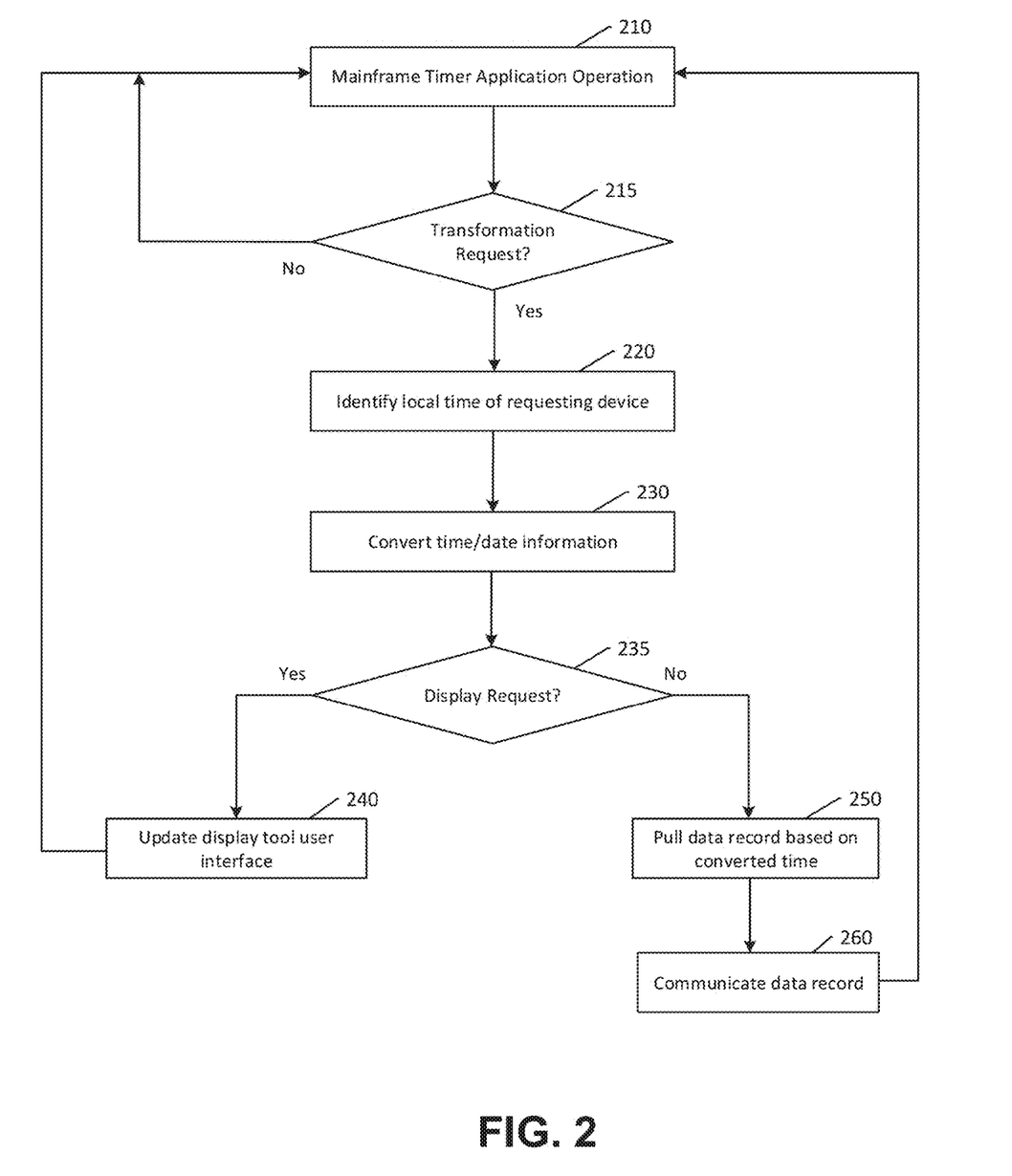
FIG. 2 shows an illustrative process for automatic timer conversion and pulling of data based on the converted time, in accordance with one or more aspects described herein.

FIG. 2 shows an illustrative process for automatic timer conversion and pulling of data based on the converted time, in accordance with one or more aspects described herein. At 210, a system timer application built within a mainframe operating system (e.g., z/OS) operates to provide common system time and/or date information for the mainframe computing system. The timer application may be synchronized between different sub-systems and/or sub-networks within an enterprise computing system to maintain a common time and date framework for network operations. Each computing system or subsystem within the computing network maintains a common system time which is synchronized between the different computing devices across the enterprise network, where the local system time, depending on the operating system running on each local machine or network of machines, may be in a time reference of a local computing device (e.g., a computing device located in the eastern United States, may be in Eastern Standard time or Eastern Daylight Savings time, and the like). Additionally, date information may be stored and maintained on each local device in either a Julian dating system, a Gregorian dating system, or other dating system, depending on local conventions, operating system requirements and the like. A timer application may operate within the mainframe system to provide data conversion and/or translation capabilities for one or more computing devices across the enterprise network. The timer application may provide a user interface accessible via a mainframe terminal via a command, an example of which is shown in FIG. 3.

Figure 4:
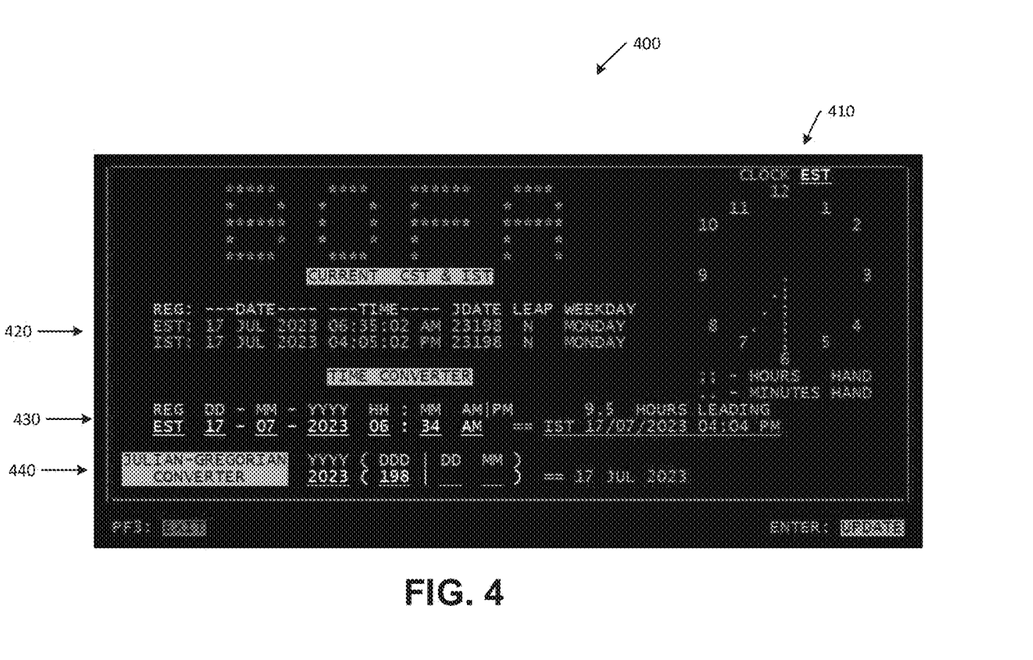
FIG. 4 shows an illustrative mainframe user interface to facilitate automatic time conversion and/or translation in accordance with one or more aspects described herein.

At 215, an input may be received by the timer application and evaluated to determine whether the input is a time or date transformation request. If not, the timer application has not received a transformation request, operation continues at 210. If, at 215, a transformation request has been received by the timer application, the timer application may identify a local time zone of the mainframe, a local time zone of the requesting device, information identifying a dating system of the requesting device (e.g., operating system information, date format information, and/or the like), a geographical location of the mainframe device and/or the requesting device, and the like at 220. At 230, the timer application may convert the time and/or date information. At 235, the input may be further analyzed to identify whether the request was for time conversion associated with a user display or for a troubleshooting event. If, at 235, the input was for a display event, the system time and/or date information, as converted and/or transformed, is displayed in the user display application, such as in FIG. 4. If, at 235, the input was associated with a troubleshooting event, the timer application may identify and/or pull one or more data records associated with the request and from an appropriate computing system. For instance, the troubleshooting request may identify a computing system, an application, or other identifying information corresponding to an operational fault or other error. At 260, the data records pulled by the timer application may be communicated to a correct troubleshooting application within the computing network.

Figure 3A:
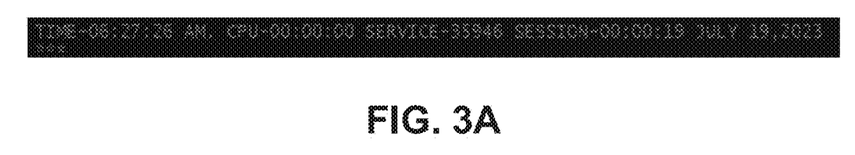
FIG. 3A shows an illustrative example of time following entry of a mainframe command according to one or more aspects described herein.

FIG. 3A shows an illustrative example of time following entry of a mainframe command according to one or more aspects described herein. For example, time and/or date information may be displayed on a mainframe terminal upon entry of a command, such as entry of a "time" command on a z/OS mainframe terminal. For example, the time command may cause at least the current local time and/or date corresponding to the mainframe terminal to be displayed upon a display screen. In some cases, a user may desire to display a difference between a local time at a terminal and/or a local time at another location associated with the mainframe, for example, a time difference between the Eastern Standard Time (EST) in the United states and India Standard Time (IST) in India. To do so, the user may utilize a timer application (e.g., a time and/or date conversion application) capable of displaying time conversion information between two (or more) time zones and/or date conversion information converting date information from a first format (e.g., a Julian calendar format) to a second format (e.g., a Gregorian calendar format).

Figure 3B:
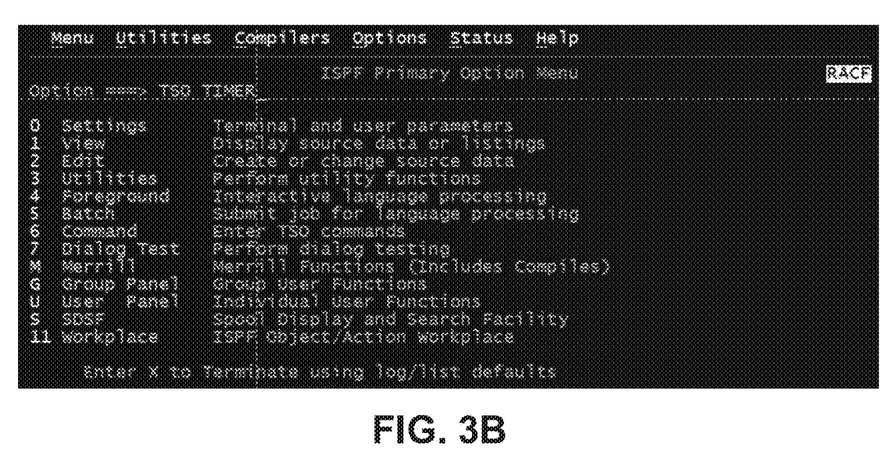
FIG. 3B shows illustrative entry of a timer command to launch the timer application from a mainframe terminal, according to one or more aspects described herein.

FIG. 3B shows illustrative entry of a timer command to launch the timer application 400 from a mainframe terminal, according to one or more aspects described herein, such as via entry of a time sharing option (TSO) command. Execution of the timer command may launch a timer application, such as via a TN3270 emulator interface. Upon entry of the TSO command, the timer application may be displayed on the user interface screen of a user device. The timer application may provide a visual indication of a current time for a particular time zone in a first portion 410 of the display. A second portion 420 of the display displays a current date and time for one or more time zones, such as a first time (e.g., a local terminal time in Eastern Standard Time) and a second time (e.g., a time local to a remote mainframe device in India Standard Time). Additionally, date information may be presented in one or more calendar formats, such as a Julian date format and a Gregorian Date format. While date information is shown for Julian and Gregorian dating systems, other calendar formats and/or dating systems may be supported. A third portion 430 of the display may include a time conversion application capable of converting time and/or date information. For example, time information may be entered and automatically converted from conforming to a first time zone to a second time zone. Additionally, based on an entered time, an entered time zone, and a target time zone, information may be provided whether the target time zone leads or lags the source time zone. A fourth section 440 of the display may include a date conversion application capable of converting an entered date from a first format (e.g., a Julian date) to a second format (e.g., a Gregorian date).

Figure 5:
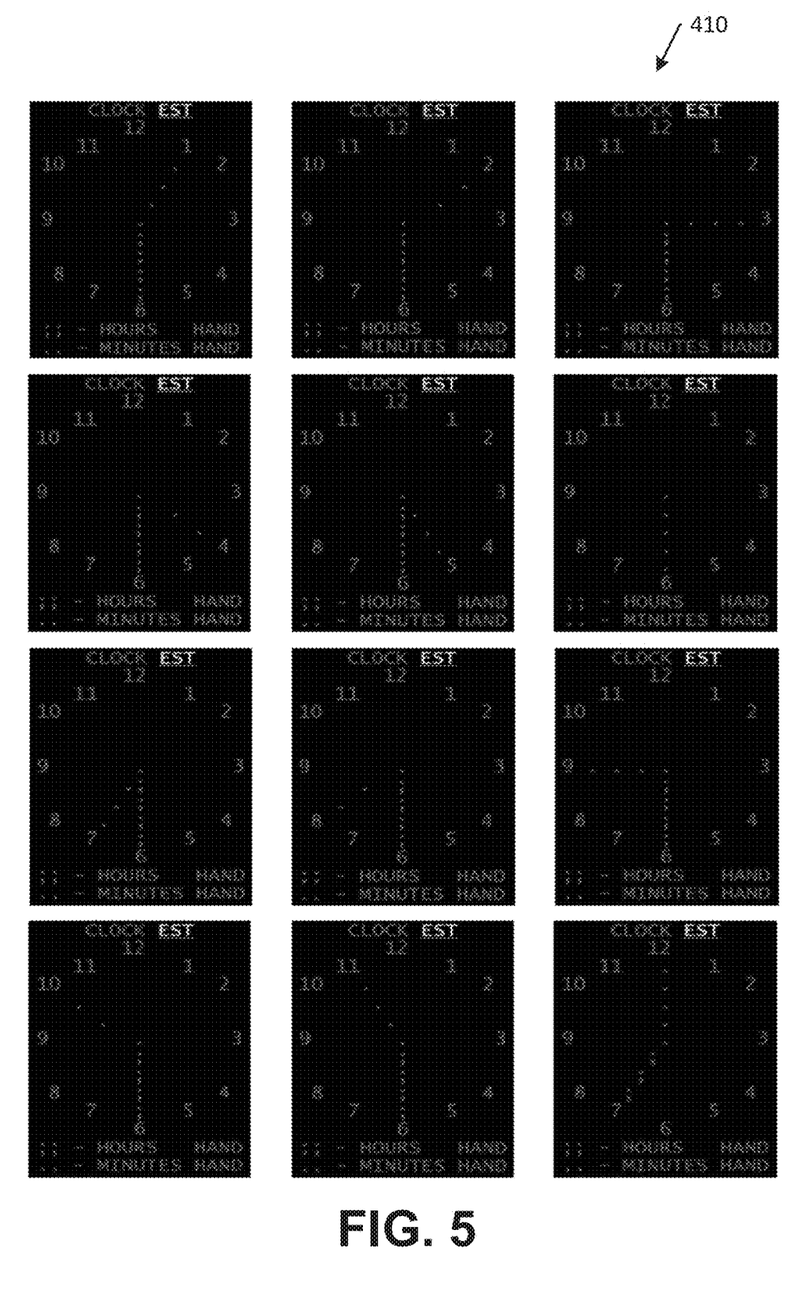
FIG. 5 shows illustrative operation of a clock display on a timer panel shown on a mainframe terminal, according to aspects described herein.

FIG. 5 shows illustrative operation of a clock display in a first portion 410 of a timer display or panel as shown on a mainframe terminal, according to aspects described herein. Because the mainframe display is not graphical, but instead displays American Standard Code for Information Interchange (ASCII) characters, an hour hand is shown as a combination of multiple instances of a first character (e.g., an ';') and a minute hand is shown as a combination of multiple instances of a second character (e.g., an '.'). Movement of the hour hand and/or minute hands are updated in defined increments (e.g., a five-minute interval for the minute hand, an hour interval for the hour hand, and the like), as shown in FIG. 5 during a sequence between the hours of 6 and 7 in the Eastern Standard Time zone. In some cases, the clock display can be configured to show the time for particular time zones, based on a selection of a time zone.

Figure 6:
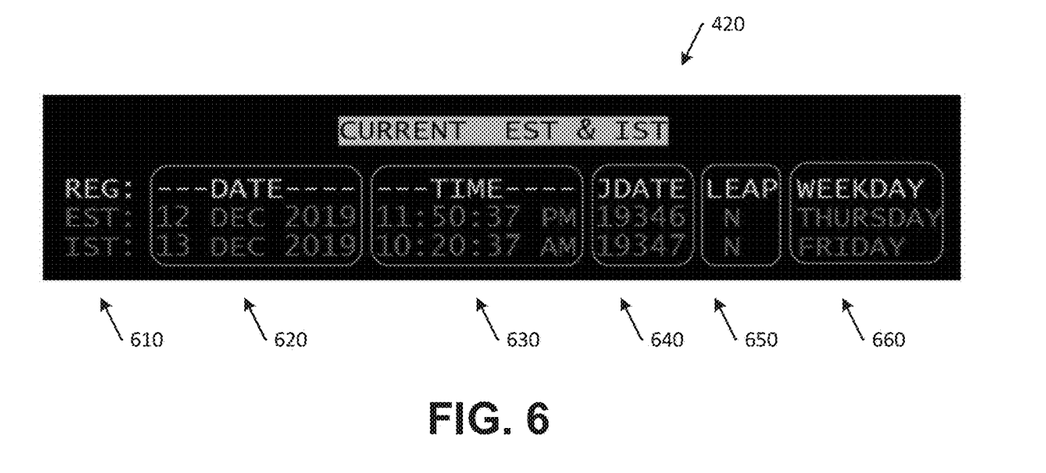
FIG. 6 shows a portion of a timer display panel displaying current time and date information, according to aspects described herein.

FIG. 6 shows the second portion 420 of a timer display panel displaying current time and date information, according to aspects described herein. For example, the current time display shows times for particular time zones 610, where, in some cases, the time zones to be displayed may be selectable. At 620, the illustrative display shows current times for selected time zones (e.g., EST, IST, and/or the like), the current date in a first format DD MMM YYYY (e.g., a European format). At 630, the illustrative display shows current EST and IST time in Civil 12 hour format HH:MM:SS AM|PM. In some cases, the time format may be configurable (e.g., a 12-hour format, a 24-hour format, and/or the like). At 640, the display shows current EST and IST Julian Date information in YYDDD format. At 650, the illustrative display shown an indication of whether the current year is a leap year or not. And at 660, the illustrative display displays a current weekday for each particular time zone.

Figure 7A:
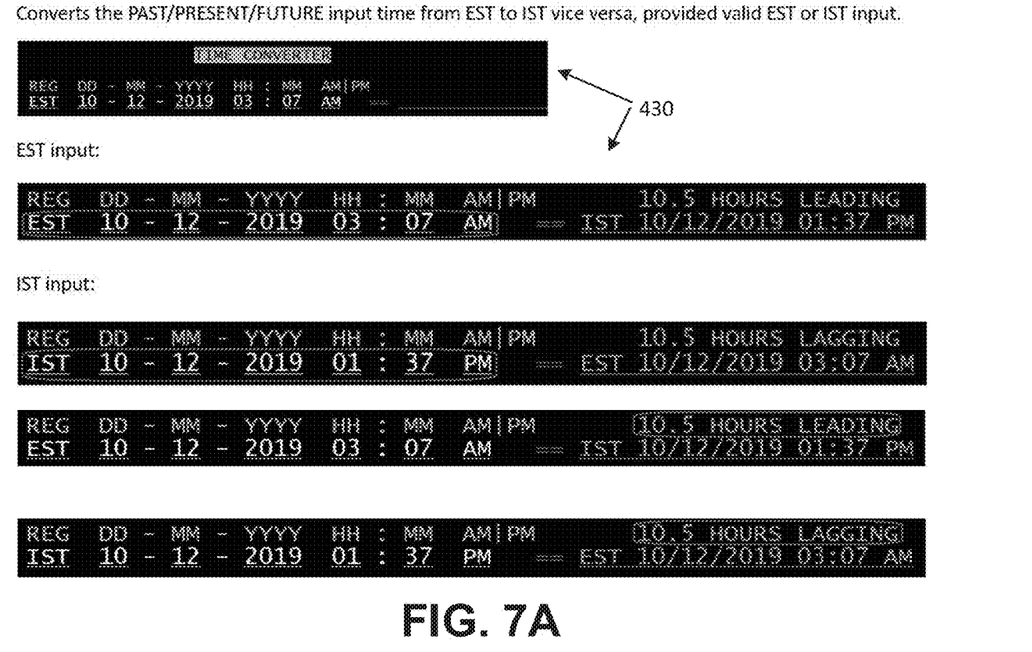
FIGS. 7A and 7B show a portion of a timer display panel displaying a time converter, according to aspects described herein.
Figure 7B:
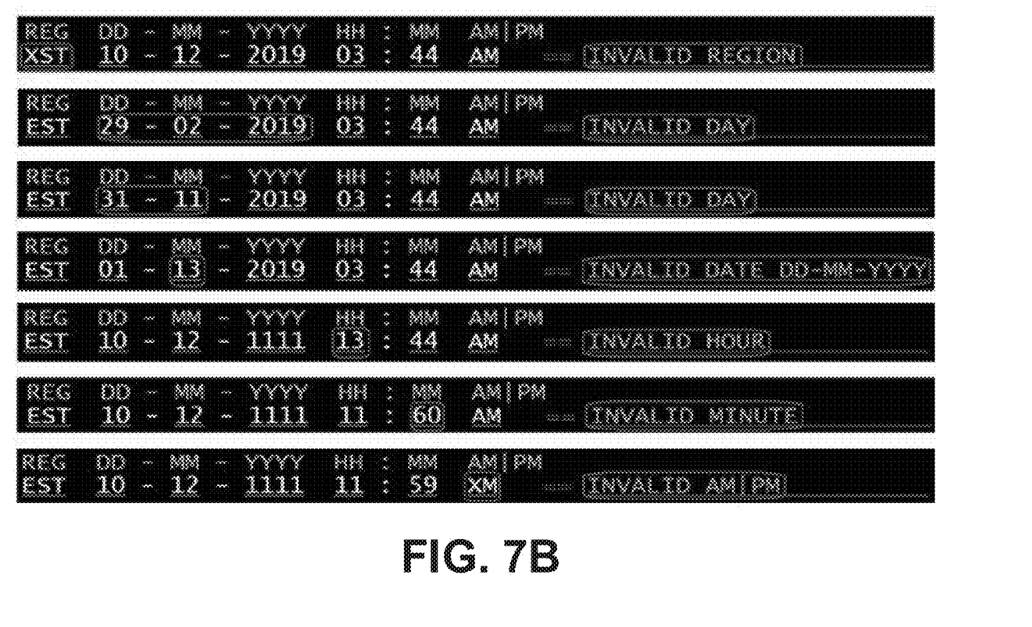

FIGS. 7A and 7B show time conversion operation associated with the third portion 630 of the timer display panel, according to aspects described herein. For example, the time conversion utility converts an entered time (e.g., an entered past, present or future time) from a first time (e.g., EST) to a second time (e.g., IST) or vice versa, provided proper validation of entered EST or IST input. In some cases, the first time zone and/or a second time zone may be selectable. In some cases, the timer application may automatically incorporate automatic conversions for daylight savings time or standard time as required for a selected time zone. For the converted time, the time converter or time conversion utility automatically calculates a time difference and an indication whether the converted time zone is leading or lagging the entered time zone. FIG. 7B shows illustrative error messages output based on input analysis before conversion, such as indicating an invalid time zone or region entry, an invalid day entry, an invalid date entry and the like.

Figure 8A:
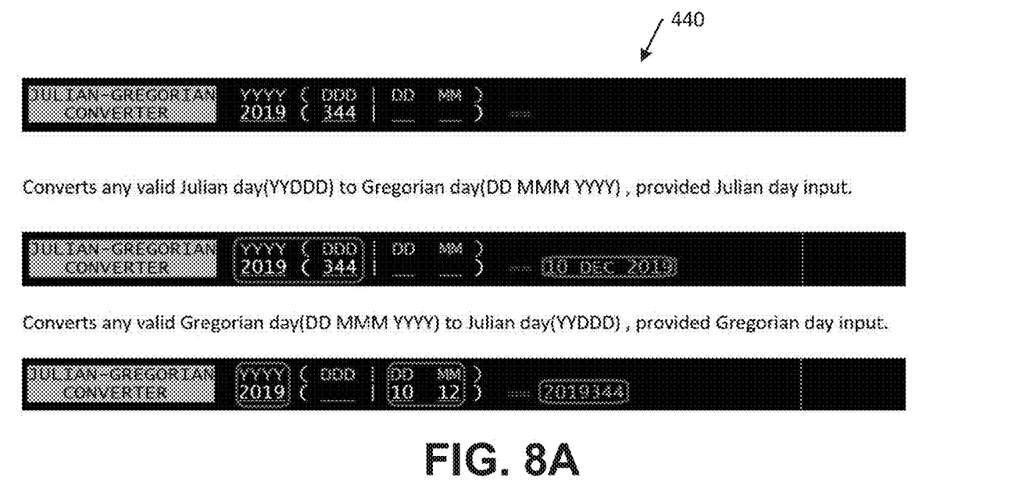
FIGS. 8A and 8B show a portion of a timer display panel displaying a calendar converter, according to aspects described herein.
Figure 8B:
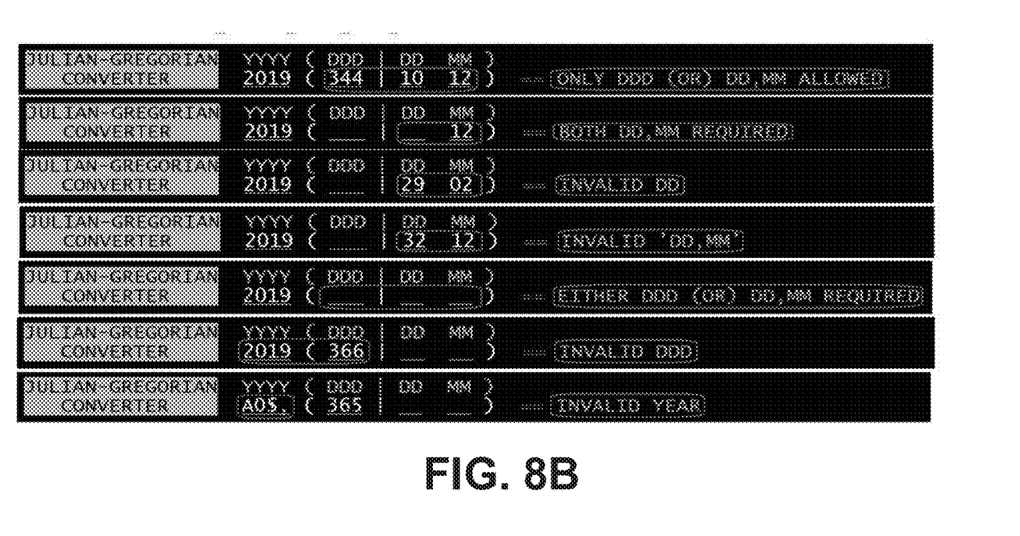
Figure 9:
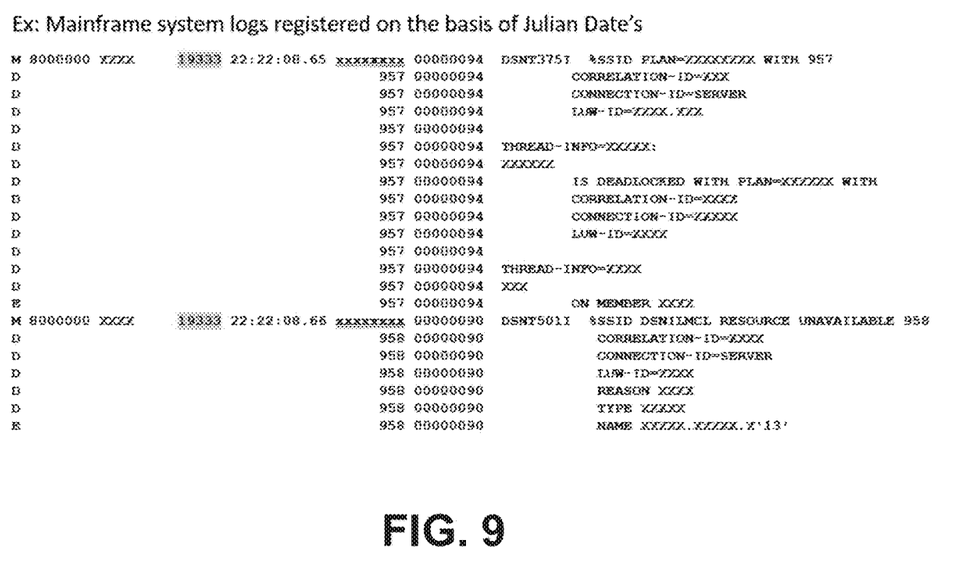
FIG. 9 shows a portion of an illustrative mainframe log using Julian calendar information, according to aspects described herein.

FIGS. 8A and 8B show a portion of a fourth section 440 of a timer display panel 440 displaying a calendar converter or calendar conversion utility, according to aspects described herein. As shown, the calendar converter converts between two calendar formats (e.g., the Julian calendar and the Gregorian calendar), but may be configured to convert between different calendar formats. Entry of a Julian calendar date causes automatic conversion to a Gregorian date. Similarly, entry of a Gregorian calendar date causes automatic conversion to a Julian date. Similarly, other calendar date conversion capabilities may also be provided. FIG. 8B shows illustrative error messages based on automatic analysis of input information before conversion, such as indicating an invalid day, missing information, an invalid day, an invalid year, and the like. FIG. 9 shows a portion of an illustrative mainframe log using Julian calendar information, according to aspects described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A mainframe-based computing platform comprising:
a processor; and
memory storing computer-readable instructions that, when executed by the processor, cause the mainframe-based computing platform to:
obtain, via a mainframe network, first system time information that comprises a system time of the mainframe network in a first time format and wherein the mainframe network comprises a first sub-network of an enterprise computing system;
convert, automatically, the first system time information into a second time format different from the first time format, wherein the second time format is incompatible with the mainframe network and corresponds to a second sub-network of the enterprise computing system;
synchronize, automatically and in response to conversion of the first system time information from the first time format to the second time format, a first network clock of the mainframe network with a second network clock of the second sub-network of the enterprise computing system;
receive, from a computing device via the mainframe network, a command to transform time information, wherein the time information is in a first format associated with a first operating system of an enterprise network device communicatively coupled to the mainframe-based computing platform;
obtain, based on the command, the time information from the enterprise network device via the mainframe network;
convert the time information from the first format to a second format, wherein the first format comprises one of the first time format and the second time format and the second format comprises the other one of the first time format and the second time format;
initiate a computing action by the mainframe computing platform and the enterprise network device based on a successful conversion of the time information from the first format to the second format;
coordinate, when operation of the computing action comprises an automated troubleshooting investigation, by the mainframe computing platform and an automated troubleshooting environment via the enterprise computing system to pulling fault information associated with the time information in the second format and sending the fault information to an indicated troubleshooting application; and
generate a mainframe user interface screen that provides a periodically updated character-based representation of a local time local to the mainframe user interface, a periodically updated character-based representation of a time local to a remote computing system, a moving representation of a character-based representation of a clock face, a minute hand, and an hour hand, and one or more inputs to facilitate entry of the time information to perform a desired time-conversion.

2. The mainframe-based computing platform of claim 1, wherein the command to transform time information comprises a command to open a time conversion application within a mainframe computing environment.

3. The mainframe-based computing platform of claim 1, wherein the command to transform time information comprises a command to obtain error log information.

4. The mainframe-based computing platform of claim 3, wherein the instructions further cause the computing platform to pull error log information corresponding to time information converted from the first format to the second format.

5. The mainframe-based computing platform of claim 1, wherein the time information comprises information corresponding to a time associated with a geographical location of a computing device associated with the mainframe-based computing platform.

6. The mainframe-based computing platform of claim 1, wherein the time information comprises information corresponding to a date associated with a computing device associated with the mainframe-based computing platform.

7. A method comprising:
obtaining, by a mainframe-based computing platform via a mainframe network, first system time information that comprises a system time of the mainframe network in a first time format and wherein the mainframe network comprises a first sub-network of an enterprise computing system;
converting, automatically by the mainframe-based computing platform, the first system time information into a second time format different from the first time format, wherein the second time format is incompatible with the mainframe network and corresponds to a second sub-network of the enterprise computing system;
synchronizing, automatically by the mainframe-based computing platform and in response to conversion of the first system time information from the first time format to the second time format, a first network clock of the mainframe network with a second network clock of the second sub-network of the enterprise computing system;
receiving, by the mainframe-based computing platform and from a computing device, a command to transform time information, wherein the time information is in a first format associated with a first operating system corresponding to an enterprise network device communicatively coupled to the mainframe-based computing platform;
obtaining, by the mainframe-based computing platform based on the command and via an enterprise network, the time information in the first format from the enterprise network device;
converting, by the mainframe-based computing platform, the time information from the first format to a second format of the mainframe computing platform, wherein the first format comprises one of the first time format and the second time format and the second format comprises the other one of the first time format and the second time format;
initiating a computing action based by the mainframe computing platform on a successful conversion of the time information from the first format to the second format;
coordinating, when operation of the computing action comprises an automated troubleshooting investigation, by the mainframe computing platform an automated troubleshooting environment via the enterprise network to pulling fault information associated with the time information in the second format and sending the fault information to an indicated troubleshooting application; and
providing a mainframe user interface screen that provides a periodically updated character-based representation of a local time local to the mainframe user interface, a periodically updated character-based representation of a time local to a remote computing system, a moving representation of a character-based representation of a clock face, a minute hand, and an hour hand, and one or more inputs to facilitate entry of the time information to perform a desired time-conversion.

8. The method of claim 7, wherein the command to transform time information comprises a command to open a time conversion application within a mainframe computing environment.

9. The method of claim 7, wherein the command to transform time information comprises a command to obtain error log information.

10. The method of claim 9, further comprising pulling error log information corresponding to time information converted from the first format to the second format.

11. The method of claim 7, wherein the time information comprises information corresponding to a time associated with a geographical location of a computing device associated with the mainframe-based computing platform.

12. The method of claim 7, wherein the time information comprises information corresponding to a date associated with a computing device associated with the mainframe-based computing platform.

13. Non-transitory computer readable media storing instructions that, when executed by a processor, cause a mainframe-based computing platform to:
obtain, via a mainframe network, first system time information that comprises a system time of the mainframe network in a first time format and wherein the mainframe network comprises a first sub-network of an enterprise computing system;
convert, automatically, the first system time information into a second time format different from the first time format, wherein the second time format is incompatible with the mainframe network and corresponds to a second sub-network of the enterprise computing system;
synchronize, automatically and in response to conversion of the first system time information from the first time format to the second time format, a first network clock of the mainframe network with a second network clock of the second sub-network of the enterprise computing system;
receive, from a computing device via the mainframe network, a command to transform time information, wherein the time information is in a first format associated with a first operating system of an enterprise network device communicatively coupled to the mainframe-based computing platform;
obtain, based on the command, the time information from the enterprise network device via the mainframe network;
convert the time information from the first format to a second format, wherein the first format comprises one of the first time format and the second time format and the second format comprises the other one of the first time format and the second time format;
initiate a computing action by the mainframe computing platform based on a successful conversion of the time information from the first format to the second format; and
coordinate, when operation of the computing action comprises an automated troubleshooting investigation, by the mainframe computing platform and an automated troubleshooting environment via the enterprise computing system to pulling fault information associated with the time information in the second format and sending the fault information to an indicated troubleshooting application; and
generate a mainframe user interface screen that provides a periodically updated character-based representation of a local time local to the mainframe user interface, a periodically updated character-based representation of a time local to a remote computing system, a moving representation of a character-based representation of a clock face, a minute hand, and an hour hand, and one or more inputs to facilitate entry of the time information to perform a desired time-conversion.

14. The non-transitory computer readable media of claim 13, wherein the command to transform time information comprises a command to open a time conversion application within a mainframe computing environment.

15. The non-transitory computer readable media of claim 13, wherein the command to transform time information comprises a command to obtain error log information.

16. The non-transitory computer readable media of claim 13, wherein the instructions further cause the mainframe-based computing platform to pull error log information corresponding to time information converted from the first format to the second format.

17. The non-transitory computer readable media of claim 13, wherein the time information comprises information corresponding to a time associated with a geographical location of a computing device associated with the mainframe-based computing platform.

18. The non-transitory computer readable media of claim 13, wherein the time information comprises information corresponding to a date associated with a computing device associated with the mainframe-based computing platform.

* * * * *